(12) United States Patent
Kang et al.

(10) Patent No.: US 7,993,142 B2
(45) Date of Patent: Aug. 9, 2011

(54) DISPLAY BOARD ASSEMBLY

(75) Inventors: Seesong Kang, Northbrook, IL (US); Steven J. Beno, Gurnee, IL (US)

(73) Assignee: ACCO Brands USA LLC, Lincolnshire, IL (US)

( * ) Notice: Subject to any disclaimer, the term of this patent is extended or adjusted under 35 U.S.C. 154(b) by 1185 days.

(21) Appl. No.: 11/668,503

(22) Filed: Jan. 30, 2007

(65) Prior Publication Data

US 2007/0141546 A1    Jun. 21, 2007

Related U.S. Application Data

(63) Continuation-in-part of application No. 11/552,667, filed on Oct. 25, 2006, now Pat. No. 7,874,842.

(60) Provisional application No. 60/731,131, filed on Oct. 28, 2005.

(51) Int. Cl.
*G09B 25/00*    (2006.01)
(52) U.S. Cl. ........................................................ 434/429
(58) Field of Classification Search .................. 434/408, 434/413, 415, 428, 429; 400/600, 615; 211/69.1
See application file for complete search history.

(56) References Cited

U.S. PATENT DOCUMENTS

| | | | |
|---|---|---|---|
| 4,090,335 A | | 5/1978 | Curatolo |
| D284,588 S | | 7/1986 | Silver |
| D295,423 S | | 4/1988 | Battaglia |
| D302,985 S | | 8/1989 | Vinck |
| 4,875,591 A | * | 10/1989 | Mikesell ....................... 211/69.1 |
| 5,137,453 A | * | 8/1992 | Hudson ......................... 434/408 |
| D354,455 S | | 1/1995 | Hosker |
| D370,353 S | | 6/1996 | Valls et al. |
| D371,806 S | | 7/1996 | Boone et al. |
| D384,104 S | | 9/1997 | Krawitz |
| 5,743,414 A | * | 4/1998 | Baudino ....................... 211/69.1 |
| 5,948,498 A | * | 9/1999 | Bianco et al. .................. 428/81 |
| D426,071 S | | 6/2000 | Vandemore |
| 6,185,850 B1 | * | 2/2001 | Erkel ............................. 40/657 |
| 6,203,878 B1 | * | 3/2001 | Davis et al. .................... 428/83 |
| D450,494 S | | 11/2001 | Morrow |
| D458,038 S | | 6/2002 | Ueno |
| 6,618,974 B2 | * | 9/2003 | Szalay ......................... 40/611.06 |
| 6,647,652 B1 | | 11/2003 | Seiber et al. |
| 6,671,988 B2 | | 1/2004 | Cyrluk |
| D500,089 S | | 12/2004 | Gillard |
| 6,837,715 B2 | * | 1/2005 | Beno ............................ 434/408 |
| 7,119,048 B2 | * | 10/2006 | Staadecker et al. ........... 503/227 |
| 7,246,458 B2 | * | 7/2007 | Ternovits et al. .............. 40/600 |
| 7,260,904 B1 | * | 8/2007 | Boisseau ....................... 40/107 |
| 7,431,590 B2 | * | 10/2008 | Gerhardt ...................... 434/408 |
| 7,591,385 B2 | * | 9/2009 | Brooks ....................... 211/94.01 |

(Continued)

OTHER PUBLICATIONS

General Binding Corporation, Quartet Visual Communication and Organization Solutions product catalogue, Jul. 2005, pp. 13, 19-20.

(Continued)

*Primary Examiner* — Kurt Fernstrom
(74) *Attorney, Agent, or Firm* — Michael Best & Friedrich LLP (57) ABSTRACT

The present invention provides a display board assembly including a display board having a dry-erase surface, a recess in the dry-erase surface of the display board, and a support member removably received at least partially within the recess and defining at least one receptacle configured to receive at least one of a dry-erase marker and an eraser.

17 Claims, 11 Drawing Sheets

U.S. PATENT DOCUMENTS

2002/0095840 A1   7/2002   Seiber et al.

OTHER PUBLICATIONS

Quartet Motion Marker Board System, 4 pages and Statement of Relevance.

ACCO® Brands, 2005 Fact Book, Feb. 2005, pp. 176, 203.
ACCO® NOBO Marker Board System sold in Europe at least as early as Dec. 2006, 5 pages.

* cited by examiner

DISPLAY BOARD ASSEMBLY

RELATED APPLICATIONS

This application is a continuation-in-part of U.S. patent application Ser. No. 11/552,667 filed on Oct. 25, 2006 now U.S. Pat. No. 7,874,842, which claims the benefit of U.S. Provisional Patent Application No. 60/731,131 filed Oct. 28, 2005, both of which are incorporated herein by reference.

FIELD OF THE INVENTION

The present invention relates to display boards.

BACKGROUND OF THE INVENTION

Many conventional dry-erase display boards typically include a rectangular dry-erase surface and a tray fixed to one edge of the display board to support markers, erasers, or other items. As such, conventional dry-erase display boards may only be mounted to a wall or other surface in a single orientation—with the tray of the display board oriented substantially horizontally—so that dry-erase markers, erasers, and/or other items may be supported and retained within the tray of the display board. Other conventional dry-erase display boards do not include any tray or structure for supporting or retaining markers, erasers, or other items. This often results in the markers or erasers being misplaced or not readily accessible to a user of the display board.

SUMMARY OF THE INVENTION

The present invention provides, in one aspect, a display board assembly including a display board having a dry-erase surface, a recess in the dry-erase surface of the display board, and a support member removably received at least partially within the recess and defining at least one receptacle configured to receive at least one of a dry-erase marker and an eraser.

The present invention provides, in another aspect, a display board assembly including a display board having a first dry-erase surface, and a support member coupled to the display board. The support member includes a second dry-erase surface.

The present invention provides, in yet another aspect, a support member configured to engage a display board having a dry-erase surface. The support member includes a base configured to directly engage the dry-erase surface of the display board. The base defines at least one receptacle configured to receive at least one of a dry-erase marker and an eraser. The support member also includes a cover coupled to the base. The cover is movable between a first position, in which the receptacle is accessible, and a second position, in which the receptacle is inaccessible. The cover includes a dry-erase surface distinct from the dry-erase surface of the display board.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
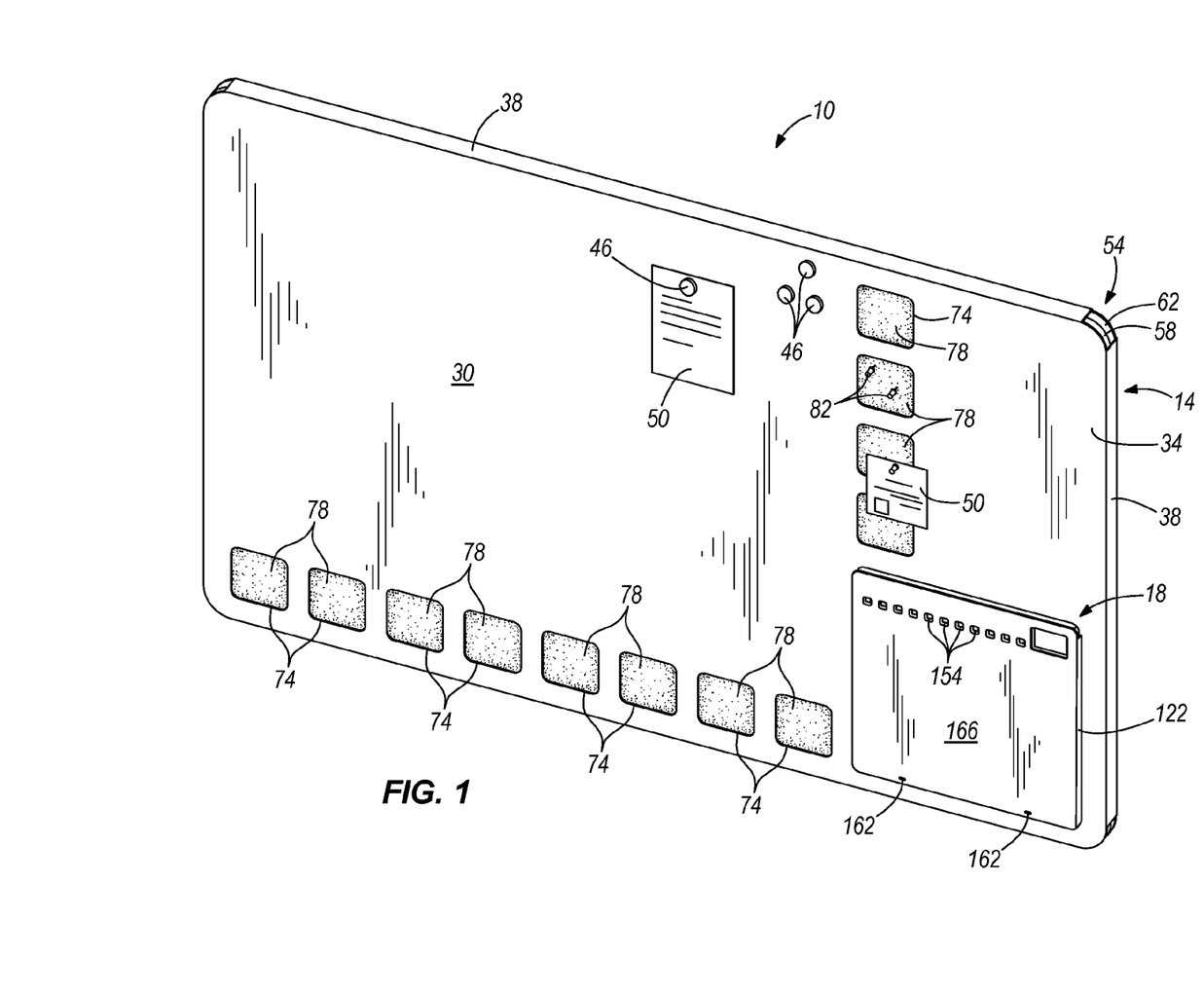
FIG. 1 is a front perspective view of a display board assembly of the present invention, illustrating a display board having a dry-erase surface and a support member coupled to the display board.
Figure 2:
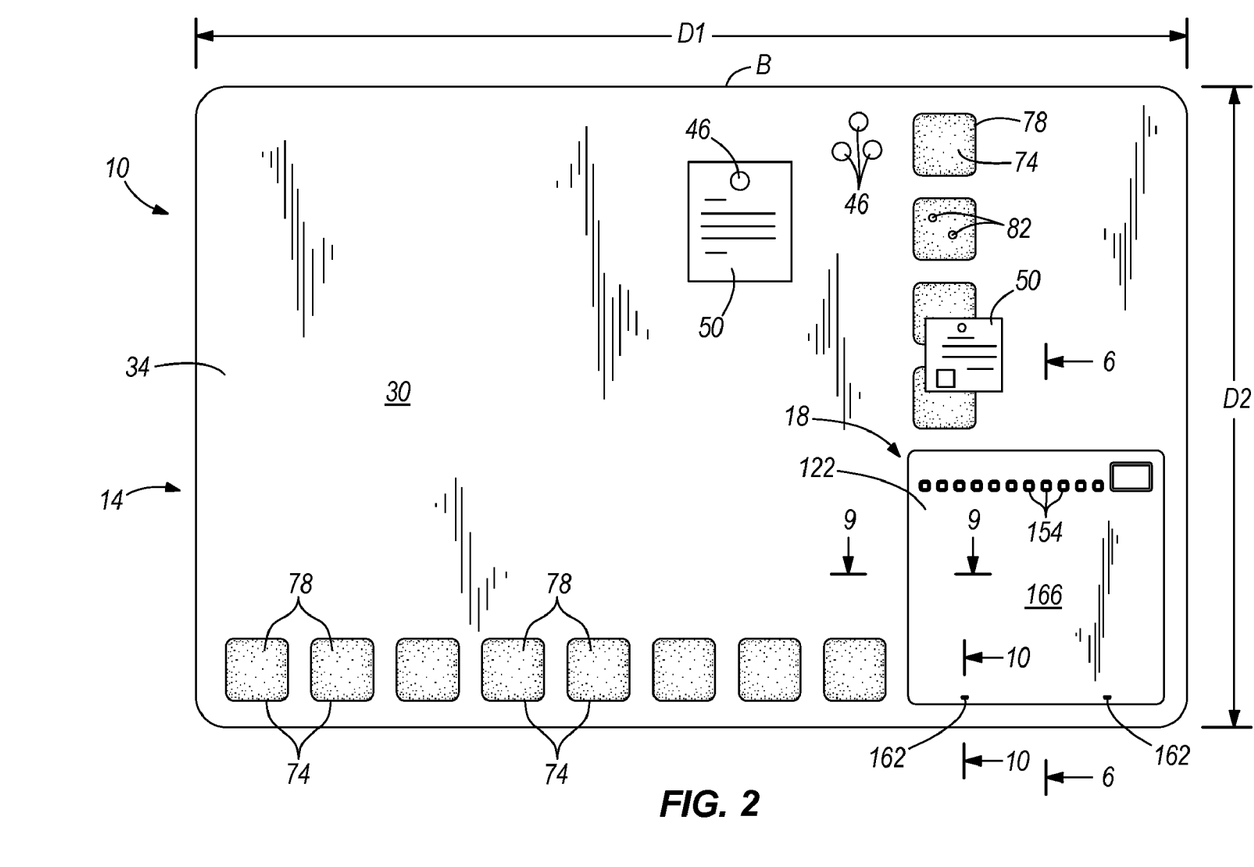
FIG. 2 is a front view of the display board assembly of FIG. 1.
Figure 3:
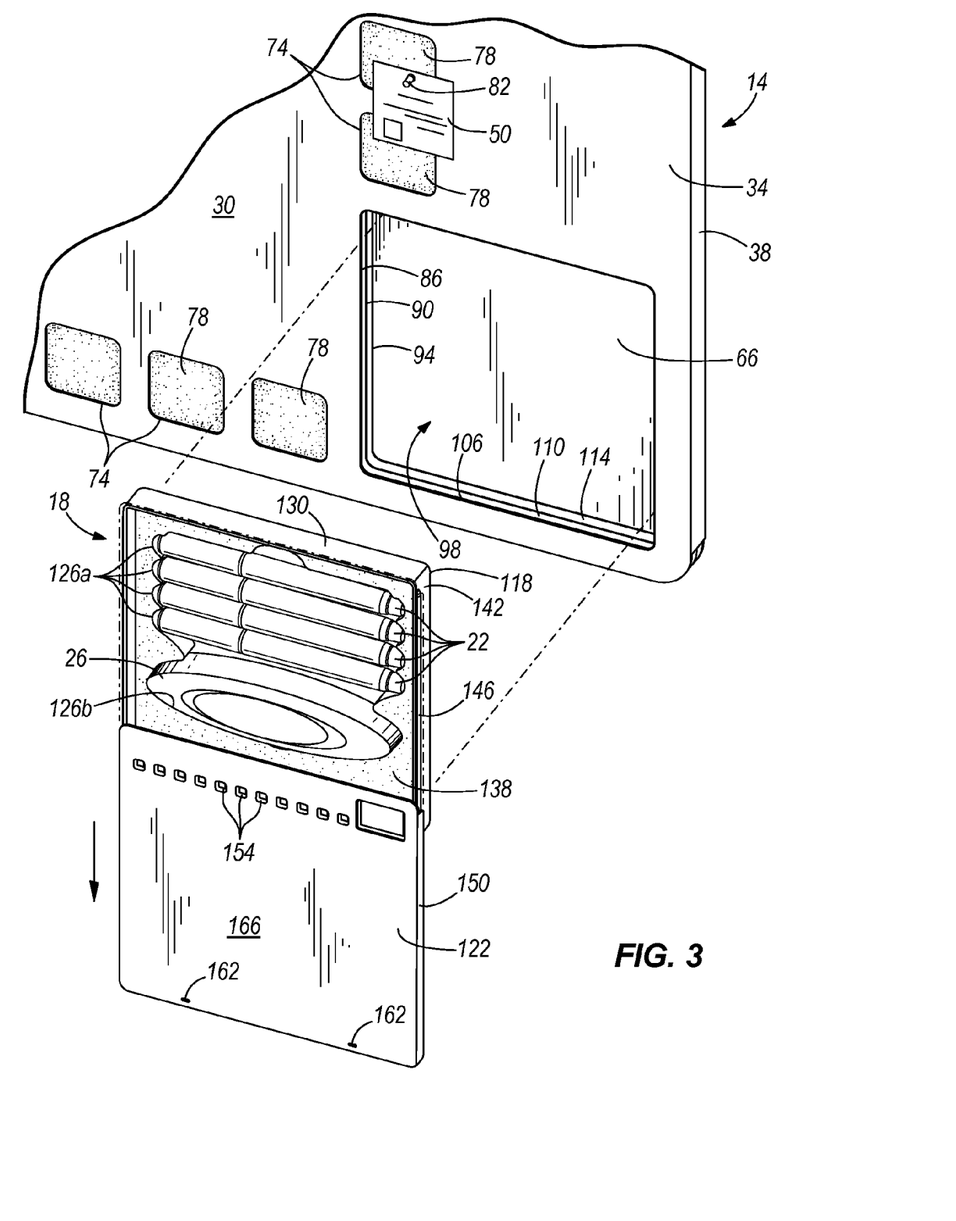
FIG. 3 is an enlarged, front perspective view of a portion of the display board assembly of FIG. 1, illustrating the support member and a recess in the dry-erase surface of the display board configured to at least partially receive the support member therein.

FIGS. 1 and 2 illustrate a display board assembly 10 including a display board 14 and a support member or caddy 18, configured to support items such as dry-erase markers 22 and an eraser 26, removably coupled to the display board 14 (see also FIG. 3). The illustrated display board 14 is rectangular-shaped, and therefore defines a major dimension D1 and a minor dimension D2. However, alternative constructions of the display board 14 may have any of a number of different shapes (e.g., circular, oval, square, and so forth). As shown in FIGS. 1 and 2, the display board 14 is oriented such that its major dimension D1 is substantially horizontal with respect to the ground, such that users of the display board 14 may write along the major dimension D1 of the display board 14. Alternatively, the display board 14 may be oriented such that its major dimension D1 is substantially vertical with respect to the ground, such that users of the display board 14 may write along the minor dimension D2 of the display board 14 (see FIG. 4).

With reference to FIGS. 1 and 2, the display board 14 includes a dry-erase surface 30 for use with dry-erase markers 22. In the illustrated construction of the display board 14, the dry-erase surface 30 is applied to a metallic outer shell 34 formed by a drawing process, which yields multiple edge surfaces 38 on the outer shell 34 (see also FIG. 5). The outer shell 34 may be made from any of a number of different metals (e.g., tin, steel, etc.) capable of being formed by a drawing process. Also, the outer shell 34 in the illustrated display board 14 is made from a magnetic material (e.g., tin, steel, etc.), such that one or more magnets 46 (see FIGS. 1 and 2) may be magnetically attached to the dry-erase surface 30 to secure paper documents 50, notes, or other loose-leaf items to the display board 14.

The dry-erase surface 30 may be applied to the outer shell 34 in any of a number of different ways. For example, the dry-erase surface 30 may be applied to the outer shell 34 as a substantially clear coating, so that the color of the underlying metal of the outer shell 34 (e.g., silver) is visible. The dry-erase surface 30 may also be applied to the outer shell 34 using a dry-erase paint on the outer shell 34, such that the color of the underlying metal of the outer shell 34 is covered by a coating of dry-erase paint of a different color (e.g., white). Further, the outer shell 34 may be covered by a conventional paint coating, which is overlaid by a substantially clear dry-erase coating. The dry-erase surface 30 may be applied to the outer shell 34 either before or after the outer shell 34 is drawn into its final shape. Those skilled in the art will understand that there are numerous other dry-erase board constructions, and that the present invention can also be utilized on boards of such other constructions.

Figure 5:
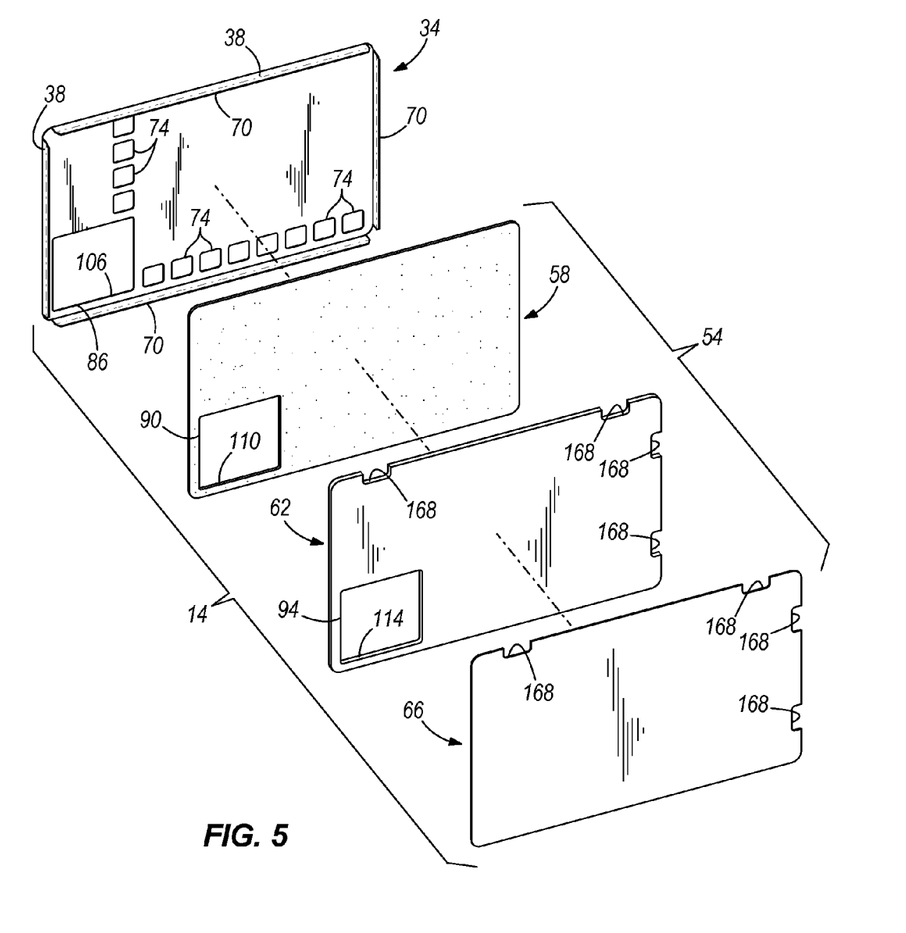
FIG. 5 is an exploded, reverse perspective view of the display board of the display board assembly of FIG. 1.

With reference to FIG. 5, the display board 14 includes a backing 54 beneath the outer shell 34. In the illustrated construction of the display board 14, the backing 54 includes a combination of a foam layer 58 (e.g., B-Grade EVA foam), a corrugate layer 62, and a chip-board layer 66. To construct the display board 14, the foam and corrugate layers 58, 62 are sandwiched between the outer shell 34 and the chip-board layer 66. Multiple tabs 70 on the outer shell 34 are folded-over to secure the foam, corrugate, and chip-board layers 58, 62, 66 within the outer shell 34 (see also FIG. 6). In other constructions, the backing 54 can include additional and/or different materials (e.g., rubber, cork, or other resilient or elastomeric materials).

As shown in FIGS. 1, 2, 4, and 5, the outer shell 34 includes a plurality of cutouts 74 in the dry-erase surface 30 to expose a portion of the backing 54, particularly the foam layer 58. As such, each of the cutouts 74 in the dry-erase surface 30 creates a zone or an area 78 on the display board 14 into which push-pins 82 may be inserted to secure paper documents 50, notes, or other loose-leaf items to the display board 14. The respective thicknesses of the foam and corrugate layers 58, 62 are such that the tips of the push-pins 82 may extend through the foam layer 58 and into the corrugate layer 62, which helps retain the push-pins 82 to the display board 14. Although the illustrated display board 14 in FIGS. 1, 2, and 4 includes a plurality of cutouts 74 in the dry-erase surface 30 arranged in a row along the major dimension D1 of the display board 14, and a plurality of cutouts 74 in the dry-erase surface 30 arranged in a row along the minor dimension D2 of the display board 14, alternative constructions of the display board 14 may include cutouts 74 in the dry-erase surface 30 in any of a number of different locations and configurations on the display board 14. Further, alternative constructions of the display board 14 may not include the cutouts 74 in the dry-erase surface 30, such that the display board would not include any zones or areas 78 through which push-pins 82 may be inserted.

As discussed above, the display board 14 combines the dry-erase surface 30, the exposed areas 78 of backing 54 for receiving push-pins 82, and the magnetic outer shell 34 to provide the magnetic dry-erase surface 30 in a single product. As such, users of the display board 14 would benefit from not having to purchase or use items that provide these features separately (e.g., a conventional dry-erase board having a cardboard or paper dry-erase layer, a conventional corrugate board for receiving push-pins, and a metal board for receiving magnets).

With reference to FIGS. 3 and 5, each of the outer shell 34, the foam layer 58, and the corrugate layer 62 includes a respective cutout 86, 90, 94 sized and configured to receive the support member 18. The respective cutouts 86, 90, 94 in the outer shell 34, the foam layer 58, and the corrugate layer 62 are substantially square-shaped to receive the substantially square-shaped support member 18, and are located in similar corners of the respective outer shell 34, foam layer 58, and the corrugate layer 62 so that the respective cutouts 86, 90, 94 are aligned when the display board 14 is assembled (see FIG. 3). Alternatively, the respective cutouts 86, 90, 94 may be differently shaped (e.g., rectangular or circular-shaped) to receive a rectangular or circular-shaped support member. Also, the respective cutouts 86, 90, 94 may be formed in alternative locations in the outer shell 34, the foam layer 58, and the corrugate layer 62 such that the support member 18 may be located elsewhere besides the corner of the display board 14.

With reference to FIG. 3, when the display board 14 is assembled, a combination of the cutouts 86, 90, 94 yields a recess 98 in the dry-erase surface 30 of the display board 14. Specifically, the recess 98 is defined by respective surfaces of the display board 14, or a combination of respective edge surfaces 106, 110, 114 of the cutouts 86, 90, 94, that extend generally normal to the dry-erase surface 30. The recess 98 is sized to snugly receive therein the support member 18 (see also FIG. 6). In other words, when the support member 98 directly engages the dry-erase surface 30 of the display board 14 via the recess 98, an interference fit between the support member 18 and the recess 98 may retain the support member 18 within the recess 98. As such, frictional forces between the support member 18 and the surfaces 106, 110, 114 comprising the recess 98, or at least the edge surfaces 110, 114 of the foam layer 58 and the corrugate layer 62, respectively, must be overcome for the support member 18 to be removed or disengaged from the display board 14.

Figure 6:
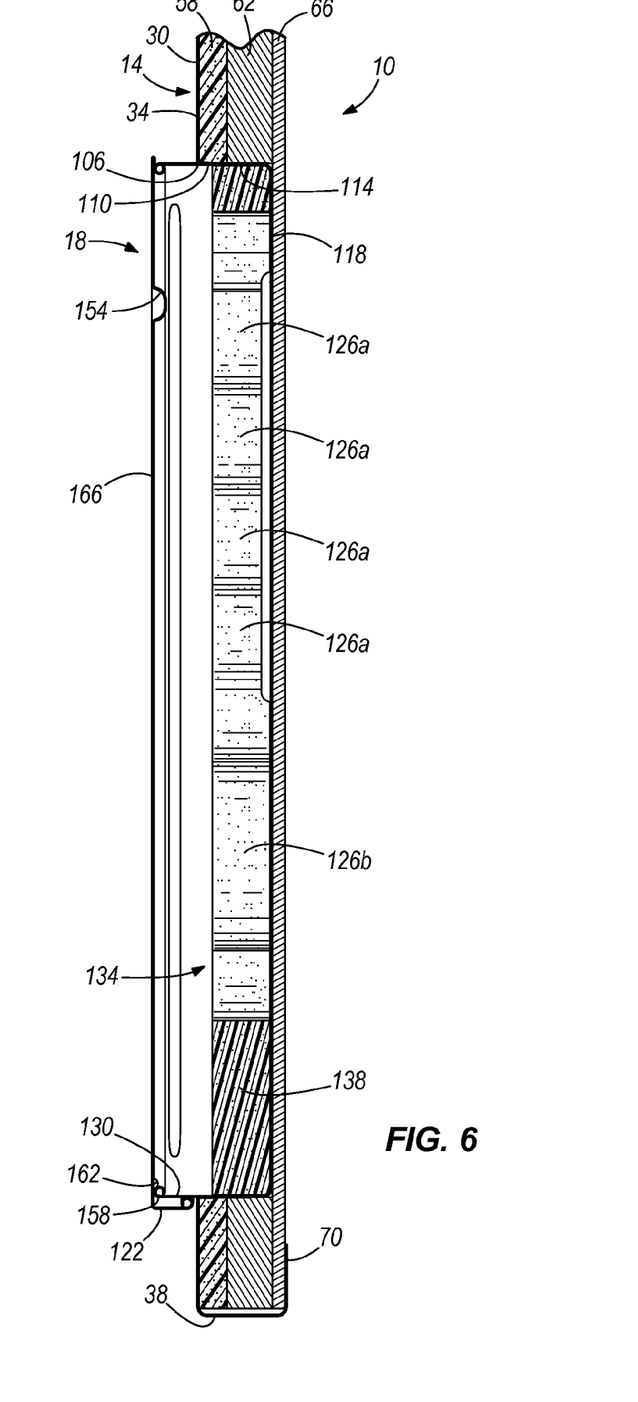
FIG. 6 is a cross-sectional view of the display board assembly of FIG. 1, taken through line 6-6 in FIG. 2.

With reference to FIGS. 3 and 6, the support member 18 includes a base 118 and a cover 122 movably (e.g., slidably) coupled to the base 118. The base 118 defines one or more receptacles 126a, 126b to at least partially receive and retain therein the dry-erase markers 22 and the eraser 26. As used herein, the term "receptacle" may include a structure or recess coupled to or formed on the base 118, configured to snugly receive at least a portion of a dry-erase marker 22, an eraser 26, or other item, as well as an open, interior space of the base 118 in which dry-erase markers 22, erasers 26, or other items may be loosely stored.

As shown in FIGS. 3 and 6, the cover 122 is slidable between a closed position (FIG. 6), in which the receptacles 126a, 126b are inaccessible, and an open position (FIG. 3), in which the receptacles 126a, 126b are accessible so that the markers 22 and/or the eraser 26 may be removed and replaced. Although the illustrated support member 18 includes receptacles 126a, 126b configured to support the dry-erase markers 22 and the eraser 26, alternative constructions of the support member 18 may include one or more receptacles configured to support any of a number of different items used with the display board 14 (e.g., push-pins, clips, magnets, and so forth).

Figure 7:
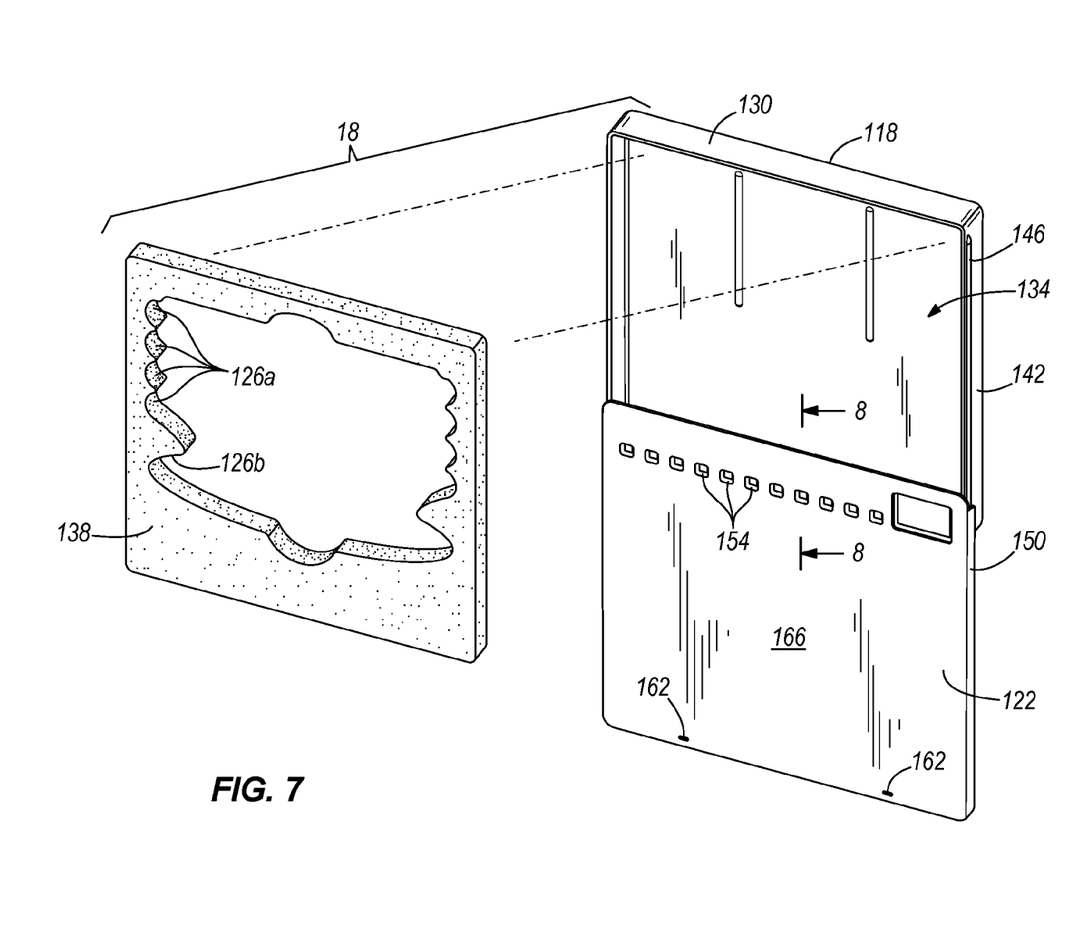
FIG. 7 is an exploded, front perspective view of the support member of the display board assembly of FIG. 1.

With reference to FIGS. 6 and 7, the illustrated base 118 of the support member 18 is a tray 130 defining a compartment 134 therein, and the receptacles 126*a*, 126*b* are formed within a foam insert 138 (e.g., Grade-B EVA foam) received within the compartment 134. Alternatively, the support member 18 may be integrally formed as one piece, including a base and one or more receptacles extending therefrom (e.g., integrally-formed, resilient clips) to at least partially receive the markers 22 and/or the eraser 26. As a further alternative, the foam insert 138 may be omitted, and the compartment 134 of the tray 130 would comprise the receptacle in which the dry-erase markers 22, the eraser 26, and other items may be loosely kept.

Figure 8:
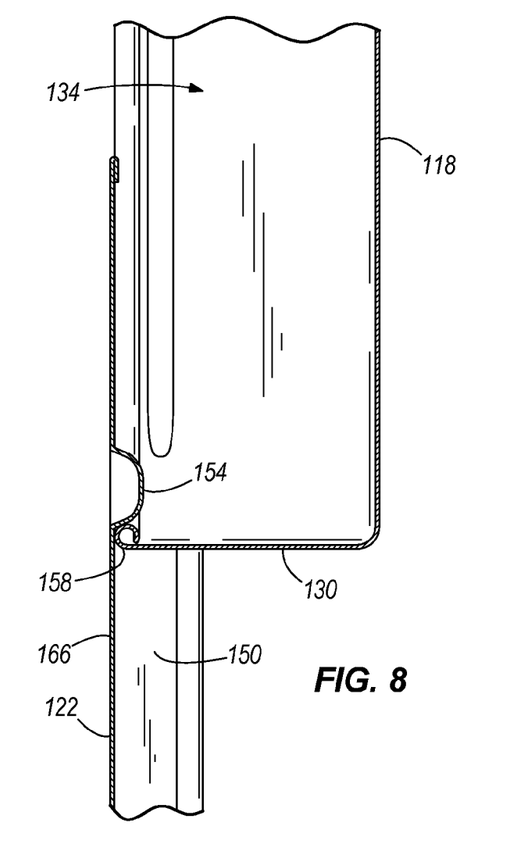
FIG. 8 is a cross-sectional view of a portion of the support member of FIG. 7, taken through line 8-8 in FIG. 7.
Figure 9:
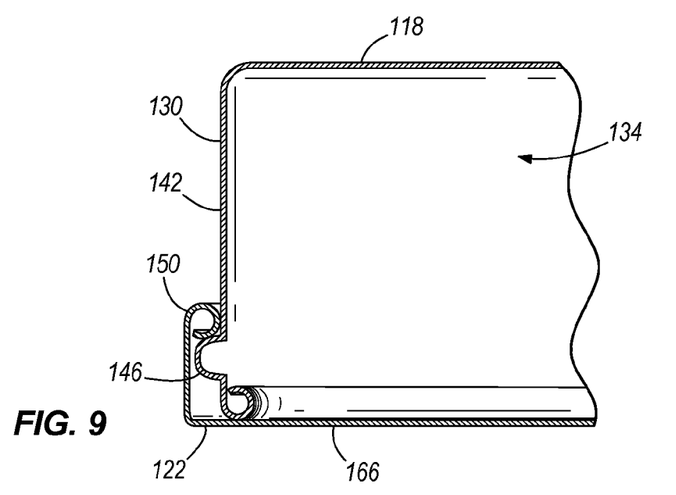
FIG. 9 is a cross-sectional view of the support member of the display board assembly of FIG. 1, taken through line 9-9 in FIG. 2.

With reference to FIGS. 7 and 9, the tray 130 includes opposite-facing side surfaces 142 having parallel guide protrusions 146 thereon, and the cover 122 includes respective lips 150 extending from the outer perimeter of the cover 122. As shown in FIG. 9, the lips 150 on the cover 122 engage the protrusions 146 to guide the cover 122 as it slides relative to the tray 130. With reference to FIGS. 7 and 8, the cover 122 includes one or more stops 154 that are indented from the outer surface of the cover 122. The stops 154 are located on the cover 122 to limit the extent that the cover 122 may slide relative to the tray 130. In other words, the stops 154 are configured to substantially prevent the cover 122 from sliding off of the tray 130 or being removed from the tray 130. FIGS. 7 and 8 illustrate the cover 122 in its fully-opened position, in which the stops 154 abut a lower edge 158 of the tray 130, to substantially prevent the cover 122 from being removed from the tray 130.

Figure 10:
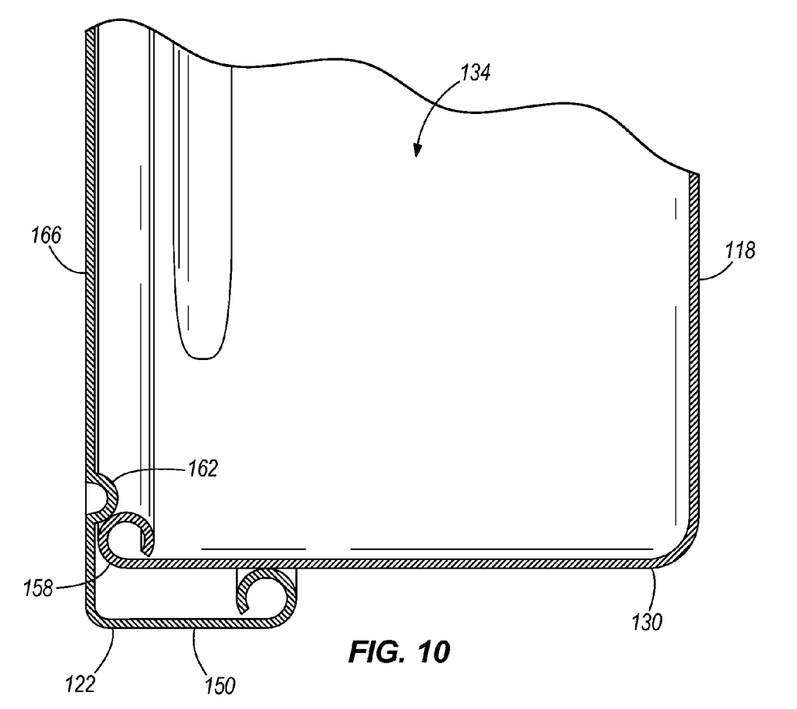
FIG. 10 is a cross-sectional view of the support member of the display board assembly of FIG. 1, taken through line 10-10 in FIG. 2.

With reference to FIGS. 7 and 10, the cover 122 includes a second set of one or more stops 162 that are indented from the outer surface of the cover 122. The stops 162 are configured to maintain the cover 122 in its closed position once it is closed. FIG. 10 illustrates the cover 122 in its fully-closed position, in which the stops 162 abut the lower edge 158 of the tray 130, to substantially prevent the cover 122 from inadvertently opening. To move the cover 122 to its opened position, sufficient force must be applied to the cover 122, in the direction of the guide protrusions 146, to cause the portion of the cover 122 immediately surrounding the stops 162 to deflect outwardly to allow the stops 162 to move around the lower edge 158 of the tray 130. Likewise, the same is true for moving the cover 122 from its opened position back to its closed position. In alternative constructions of the support member 18, different structure may be utilized to attach the cover 122 to the base 118 of the support member 18. For example, an alternative construction of the support member 18 might include a cover pivotably coupled to the base 118. Other alternative constructions of the support member 18 might omit a cover entirely.

With reference to FIGS. 1-4 and 7, the outer surface of the cover 122 is a dry-erase surface 166. As such, the cover 122 may be made from the same material as the outer shell 34, and the dry-erase surface 166 may be applied to the cover 122 in the same way as the dry-erase surface 30 is applied to the outer shell 34. Providing the dry-erase surface 166 on the cover 122 of the support member 18 allows users of the support member 18 to write on the dry-erase surface 166 of the cover 122 when the user has access to the support member 18, but not the display board 14. As such, the dry-erase surface 166 is essentially "portable," and may be carried by the user as part of the support member 18 to locations remote from the accompanying display board 14.

Figure 4:
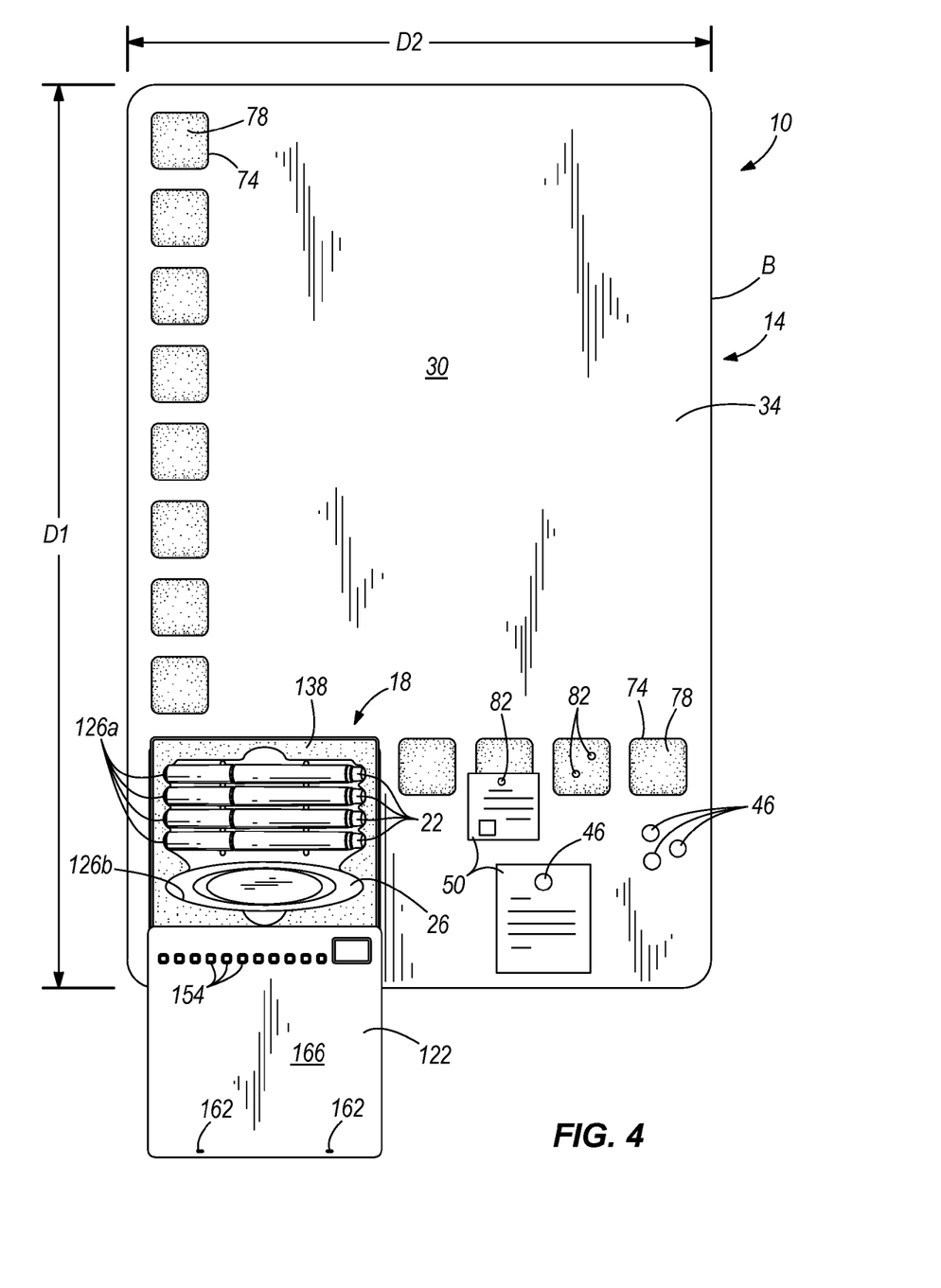
FIG. 4 is a front view of the display board and support member of FIG. 1, illustrating an alternative orientation of the display board and the support member.

With reference to FIGS. 2 and 4, the dry-erase surface 30 of the display board 14 defines an outer boundary B, and the dry-erase surface 166 of the support member 18 is located within the outer boundary B of the dry-erase surface 30 of the display board 14, at least when the cover 122 is closed. As such, to an observer looking at the display board assembly 10 head-on (such as the views shown in FIGS. 2 and 4), the dry-erase surface 166 of the support member 18 appears to "fill" the cutout or recess 98 in the dry-erase surface 30 of the display board 14; appearing to present a substantially continuous, uninterrupted dry-erase writing surface (30 and 166).

However, the respective dry-erase surfaces 166, 30 of the support member 18 and the display board 14 are substantially parallel when the support member 18 is supported within the recess 98, and the respective dry-erase surfaces 166, 30 are offset from one another in a direction generally normal to the dry-erase surface 30 of the display board 14 (see also FIG. 6). The respective dry-erase surfaces 166, 30 are offset from one another to facilitate hand-removal of the support member 18 from the recess 98. Also, by offsetting the respective dry-erase surfaces 166, 30, the cover 122 of the support member 18 may be opened to access the markers 22, eraser 26, or other items stored in the support member 18, while the support member 18 is supported within the recess 98. Alternative constructions of the display board assembly 10 might include a recess or a support member sized accordingly to allow the dry-erase surface of the support member to be substantially flush and aligned with the dry-erase surface of the display board so as to present a substantially continuous, uninterrupted dry-erase writing surface. In such a construction, an ejection mechanism or aperture might be incorporated with the display board to facilitate removal of the support member from the recess.

Yet other constructions of the display board assembly 10 may include positioning the support member 18 such that it at least partially overlies the outer boundary B of the dry-erase surface 30. In other words, when such a construction of the display board assembly is viewed "head-on," as discussed above, the dry-erase surface 166 of the support member 18 would appear, for example, to fill-in a missing corner of the dry-erase surface of the display board, or a missing portion of the top, bottom, or sides of the dry-erase surface of the display board.

With reference to FIGS. 2 and 4, the display board assembly 10 may be mounted to a wall or other surface such that the major dimension D1 of the display board 14 is substantially horizontal or substantially vertical with respect to the ground. Notches 168 formed in the backing 54 (see FIG. 5) are positioned to receive suitable mounting hardware (e.g., nails, hooks, brackets, etc.) to permit hanging the display board 14 in the multiple orientations.

Because the support member 18 and the recess 98 in the dry-erase surface 30 of the display board 14 are substantially square-shaped, the support member 18 may be re-oriented relative to the display board 14 depending upon the desired mounting orientation of the display board 14. For example, when the display board 14 is horizontally mounted (i.e., with the major dimension D1 substantially horizontal with respect to the ground), the support member 18 may be oriented within the recess 98 such that the markers 22 are substantially parallel with the major dimension D1 of the display board 14 (see FIG. 3). Also, when the display board 14 is vertically mounted (i.e., with the major dimension D1 substantially vertical with respect to the ground), the support member 18 may be removed from the recess 98, reoriented such that the markers 22 are substantially parallel with the minor dimension D2 of the display board 14, and re-positioned within the recess 98 (see FIG. 4). By allowing such re-orientation of the support member 18 relative to the display board 14, the dry-erase markers 22 stored in the support member 18 are less likely to dry-up between periods of use.

Figure 11:
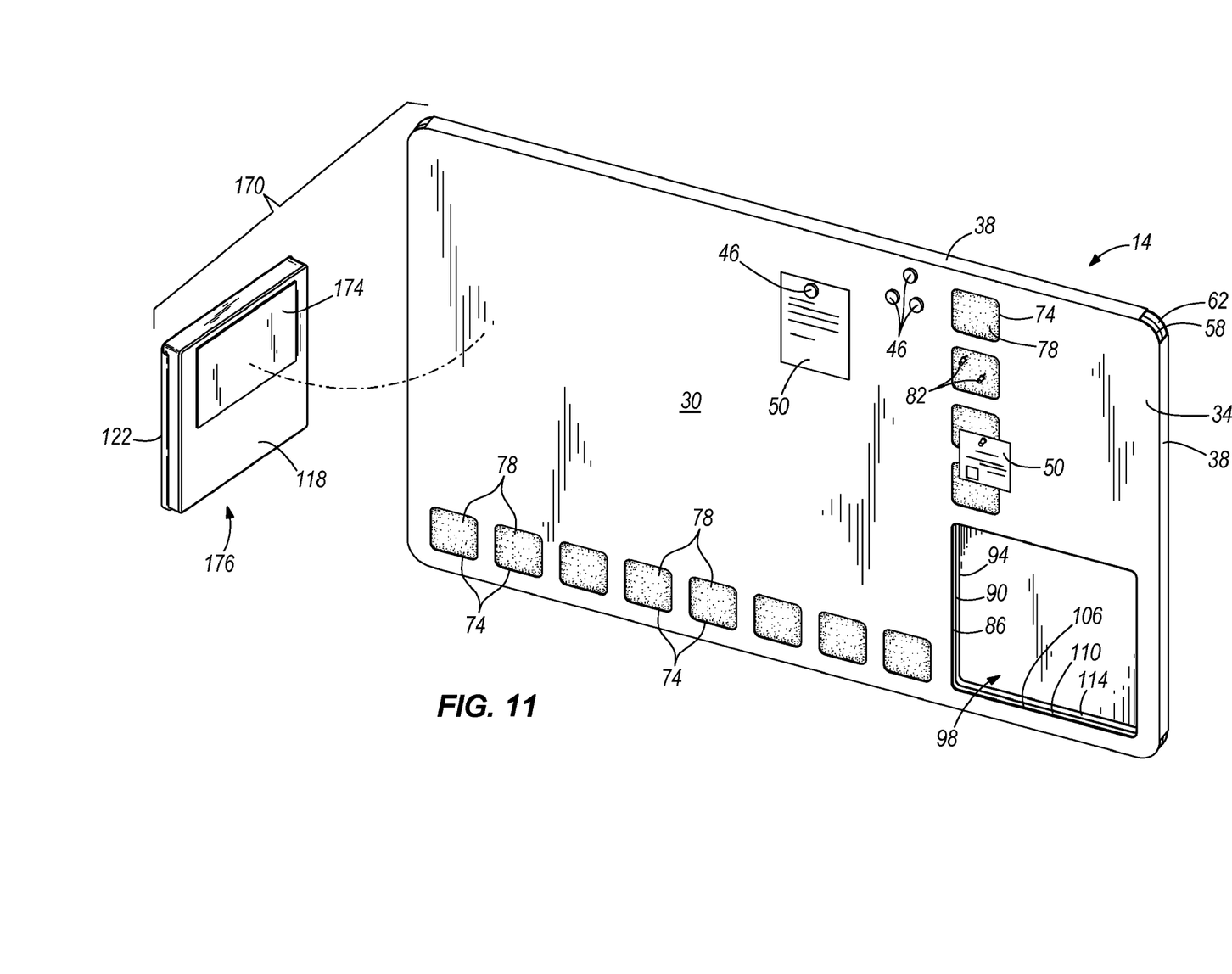
FIG. 11 is an alternative construction of the display board assembly of FIG. 1, illustrating a magnet coupling the support member to the display board.

With reference to FIG. 11, an alternative construction of a display board assembly 170 might include a magnet 174 coupled to a support member 176, which is substantially similar to the support member 18 of FIGS. 1-4 and 6-10. Like components and features are labeled with like reference numerals. In addition to being supported within the recess 98 in the dry-erase surface 30 of the display board 14, the support member 176 may also be removably coupled directly to the dry-erase surface 30 of the display board 14 by the magnet 174, which is magnetically attracted to the metal outer shell 34 of the display board 14. As such, the support member 176 may be removed from the recess 98 during use, and magnetically attached to any portion of the dry-erase surface 30 of the display board 14 either temporarily while the display board assembly 170 is being used, or for long-term storage. Although the illustrated support member 176 in FIG. 11 includes the magnet 174 positioned on a rear or back surface of the support member 176, the magnet 174 may be positioned on any side surface of the support member 176 so the support member 176 may be magnetically attached to any edge surface 38 of the display board 14. Further, the support member 176 may include more than one magnet 174 thereon to allow the support member 176 to be magnetically attached to the display board 14 in any of a number of different orientations relative to the display board 14. Yet other constructions of the display board assembly 170 might include a display board without the recess 98, such that the support member 176 directly engages the dry-erase surface 30 via the magnet 174 for long-term storage.

Figure 12:
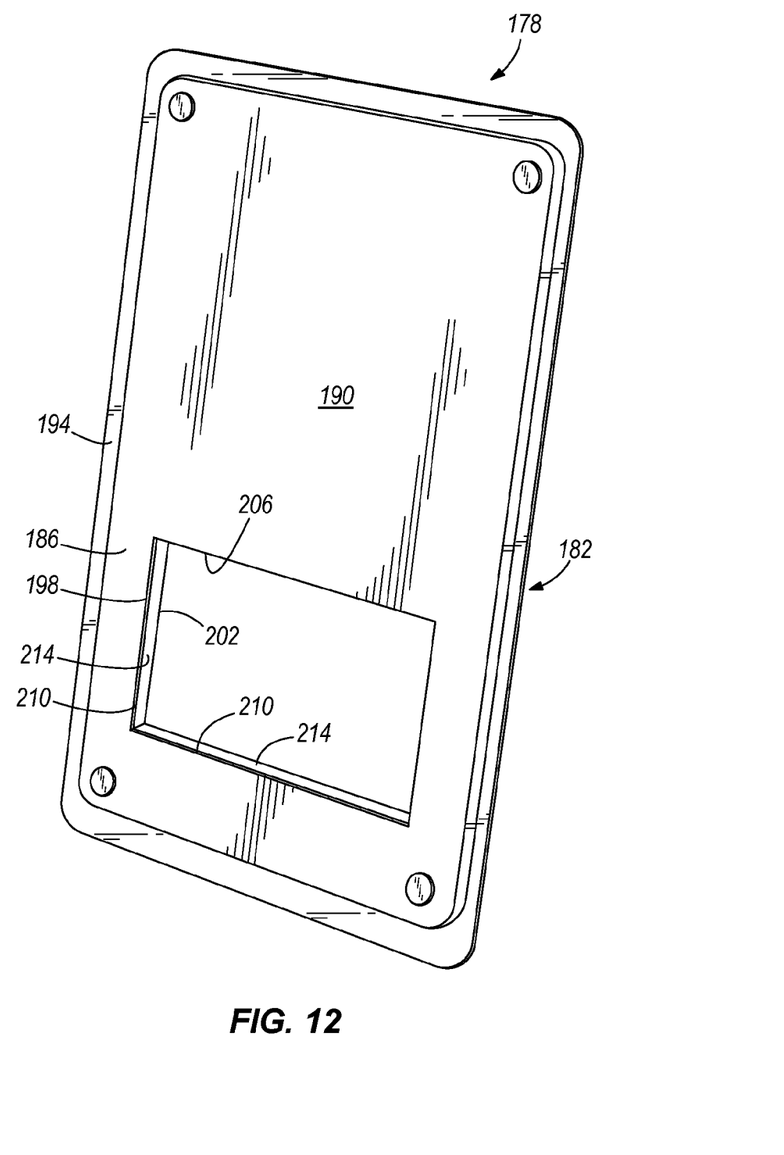
FIG. 12 is another alternative construction of the display board assembly of FIG. 1.

With reference to FIG. 12, another alternative construction of a display board assembly 178 might include a display board 182 having an outer layer 186, which includes a dry-erase surface 190, and a backing layer 194 adjacent the outer layer 186. The outer layer 186 and the backing layer 194 may include respective cutouts 198, 202, which when combined, comprise a recess 206 in the dry-erase surface 190 of the display board 182. The recess 206 is defined by respective surfaces of the display board 182, or a combination of respective edge surfaces 210, 214 of the cutouts 198, 202 that extend generally normal to the dry-erase surface 190 of the display board 182. The bottom-most surfaces 210, 214, relative to the illustrated orientation of the display board 182 in FIG. 12, may be utilized to support dry-erase markers 22, erasers 26, or any of a number of different items (e.g., push-pins 82, clips, magnets 46, and so forth). Grooves or other recesses could be formed in the surfaces 210, 214 to facilitate retaining the items. Should the display board 182 be hung in a different orientation, the other surfaces 210, 214 would be available to support the items. In other words, if the illustrated display board 182 in FIG. 12 is re-oriented by rotating the display board 182 ninety degrees counter-clockwise, the surfaces 210, 214 adjacent to the bottom-most surfaces 210, 214 shown in FIG. 12 would be utilized to support the items. Of course, a support member like the support member 18 could be inserted into the recess 206 of the display board 182.

Various features of the invention are set forth in the following claims.

What is claimed is:

1. A display board assembly comprising:
   a display board including a dry-erase surface;
   a recess in the dry-erase surface of the display board; and
   a support member received at least partially within the recess and defining a receptacle configured to receive a plurality of dry-erase markers therein, wherein the support member is completely removable from the recess.

2. The display board assembly of claim 1, wherein the support member includes a base and a foam insert within the base, the foam insert at least partially defining the receptacle.

3. The display board assembly of claim 1, wherein the support member includes
   a base at least partially defining the receptacle; and
   a cover coupled to the base;
   wherein the cover is movable between a first position, in which the receptacle is accessible, and a second position, in which the receptacle is inaccessible.

4. The display board assembly of claim 3, wherein the cover includes a dry-erase surface.

5. The display board assembly of claim 3, wherein the cover is slidably coupled to the base, and wherein the cover includes a stop configured to substantially prevent removal of the cover from the base.

6. The display board assembly of claim 1, wherein the support member is retained within the recess in the dry-erase surface by an interference fit.

7. The display board assembly of claim 1, wherein the display board includes a backing beneath the dry-erase surface, wherein the dry-erase surface includes a first cutout and the backing includes a second cutout, and wherein the first and second cutouts at least partially form the recess in the dry-erase surface of the display board.

8. The display board assembly of claim 1, wherein the dry-erase surface comprises a magnetic surface.

9. The display board assembly of claim 1, wherein the display board includes a backing beneath the dry-erase surface, and wherein the display board includes at least one cutout in the dry-erase surface to expose the backing.

10. The display board assembly of claim 9, wherein the backing includes at least one of a corrugate board and a foam sheet.

11. The display board assembly of claim 1, wherein the dry-erase surface of the display board is a first dry-erase surface, and wherein the support member includes a second dry-erase surface.

12. The display board assembly of claim 11, wherein the second dry-erase surface is substantially parallel to the first dry-erase surface.

13. The display board assembly of claim 12, wherein the second dry-erase surface is offset from the first dry-erase surface in a direction normal to the first dry-erase surface.

14. The display board assembly of claim 11, wherein the first dry-erase surface defines an outer boundary, and wherein the second dry-erase surface is located within the outer boundary of the first dry-erase surface.

15. The display board assembly of claim 1, wherein at least a portion of the dry-erase surface of the display board is magnetically attractive, and wherein the support member further includes a magnet for engaging the support member to the dry-erase surface of the display board.

16. The display board assembly of claim 1, wherein each of the recess and the support member are substantially square-shaped.

17. The display board assembly of claim 1, wherein the receptacle is configured to receive an eraser in addition to the plurality of dry-erase markers.

* * * * *